(12) United States Patent
Strassmann et al.

(10) Patent No.: US 7,045,150 B2
(45) Date of Patent: May 16, 2006

(54) TELLURIUM CONTAINING NUTRIENT FORMULATION AND PROCESS FOR ENHANCING THE CUMULATIVE WEIGHT GAIN OR FEED EFFICACY IN POULTRY

(75) Inventors: Gideon Strassmann, Washington, DC (US); Benjamin Sredni, Kfar Saba (IL); Michael Albeck, Ramat Gan (IL); Ascher Shmulewitz, Tel Aviv (IL)

(73) Assignee: Tellus Biotech Ltd., Tel-Aviv (IL)

( * ) Notice: Subject to any disclaimer, the term of this patent is extended or adjusted under 35 U.S.C. 154(b) by 402 days.

(21) Appl. No.: 09/918,865

(22) Filed: Jul. 31, 2001

(65) Prior Publication Data
US 2003/0113409 A1   Jun. 19, 2003

(51) Int. Cl.
*A61K 33/24* (2006.01)
(52) U.S. Cl. .................................. 424/650; 424/439
(58) Field of Classification Search ................ 549/347, 549/369; 424/650, 439
See application file for complete search history.

(56) References Cited

U.S. PATENT DOCUMENTS

| 4,761,490 A | * | 8/1988 | Albeck et al. ............... 549/347 |
| 4,929,739 A | * | 5/1990 | Sredni et al. ................ 549/347 |
| 4,946,437 A | * | 8/1990 | Sredni et al. ................ 604/522 |
| 4,962,207 A | * | 10/1990 | Albeck et al. ............... 549/334 |
| 5,126,149 A | * | 6/1992 | Sredni et al. ................ 424/650 |
| 5,475,030 A | * | 12/1995 | Sredni et al. ................ 514/553 |
| 5,576,347 A | * | 11/1996 | Sredni et al. ................ 514/467 |
| 5,610,179 A | * | 3/1997 | Sredni et al. ................ 514/450 |
| 5,654,328 A | * | 8/1997 | Sredni et al. ................ 514/450 |
| 5,997,911 A | * | 12/1999 | Brinton et al. .............. 424/632 |
| 6,642,032 B1 | * | 11/2003 | Lowenthal et al. ........ 435/91.1 |

OTHER PUBLICATIONS

Klotz Lars-Oliver (Journal of Nutrition 133 (5 Suppl 1) 1448S-51S, 2003).*
Taylor (Biological Trace Element Research 55 (3) 231-9, 1996).*

* cited by examiner

*Primary Examiner*—David Lukton

(57) ABSTRACT

A novel nutrient formulation containing tellurium for use in poultry, and a method of feeding it which improves subsequent livability, cumulative feed efficacy or weight gain is disclosed.

3 Claims, No Drawings

TELLURIUM CONTAINING NUTRIENT FORMULATION AND PROCESS FOR ENHANCING THE CUMULATIVE WEIGHT GAIN OR FEED EFFICACY IN POULTRY

BACKGROUND OF THE INVENTION

1. Field of the Invention

This invention relates to a tellurium containing nutritional formulation that enhances the cumulative weight gain and feed efficacy in poultry. There is compelling evidence from the investigation of chick models that tellurium compounds act to influence the growth performance of chicks. The additive effects in increasing body weight are dose related and most significant at tellurium compound feed concentrations of 12.5 g/metric ton.

2. Description of the Related Art

The present invention is based on the discovery that the addition of a tellurium species to the diet of poultry a few days after hatching increases the growth rate of the young chicks.

Prior research has shown that improvement of the quality of the nutrition of broilers have provided the possibility of increasing their growth rate in modem broiler strains. The increased growth is reflected in either an increased weight of the adult chicken, or a reduction in the period of time required for obtaining an adult chicken. The most dramatic growth rate increase is manifested primarily in the first four weeks after hatching. An increased growth rate in these first four weeks has been found to involve an increased weight of grown up broilers at the age of 42 days, an age that they are typically ready for consumption.(Zubair A. K., 52 WORLD POULTRY SCIENCE J. 189–201 (1996)). According to the state of the art, at 14 days, approximately 50% of the broilers have a body weight of between 365 and 390 grams, and at 42 days, approximately 60% of the broilers have a body weight between 2100 and 2300 grams.

Growth of the young chick only starts after the yolk sac has been resorbed. Further, it is state of the art to deprive the hatched chick of nutrition in the first days of its life in order to enable it to exhibit compensatory growth. An earlier start of growth is reflected in an increased weight of the grown up chicken. It is, therefore, desirable to feed chicks a food composition that accelerates absorption of the yolk sac.

Materials promoting growth, the so-called "growth stimulants", are typically employed in animal feed for producing quicker growth and increased meat tissue production. The known growth promoting materials may be categorized as either antibiotics, synthetic chemical growth promoters, or sexual hormones. The use of sexual hormones has been forbidden in certain countries.

There are a number of prior art food compositions to enhance growth of young chicks. U.S. Pat. No. 6,258,399 discloses a composition containing monosaccharides, disaccharides, oligosaccharides fed immediately after hatching and during the first days of life that has a growth enhancing and mortality reducing effect.

Others have added various nutrients and vitamins to feed to prevent disease. For example, U.S. Pat. No. 5,516,525 discloses the addition of vitamin D derivatives to animal feed to prevent development of tibial dyschondroplasia.

Increasing interest has been drawn to the substances known as trace elements, i.e. elements absolutely vital to the human organisms, albeit in minute amounts. Selenium is an essential trace element for proper physiological function in humans. Deficiency can lead to improper functioning of the body's metabolic processes, and to various diseases and disorders. Selenium deficiency has been seen in people who rely on total parenteral nutrition (TPN) as their sole source of nutrition. Selenium deficiency is most commonly seen in China, where the selenium content in the soil, and therefore, selenium intake, is very low. It is characterized by Keshan Disease which results in an enlarged heart.

A blood selenium concentration of 0.02 μg/ml may be considered the critical threshold in defining selenium deficiency. The Food and Drug Administration (FDA) established Recommended Dietary Allowance (RDA) for selenium is 55 μg for adults and 70 μg for lactating women.

Several studies reporting the beneficial effects of selenium supplementation in animals have appeared in the literature. With supplementation with intraruminal pellets of selenium the live weights of ewes receiving selenium were generally but not consistently higher than those of unsupplemented ewes. However, fleece weights were significantly greater in selenium supplemented ewes.(Langerlands, J. P. et al; Subclinical Selenium Deficiency. 1-Selenium Status and the Response in Live Weight Gains and Wool Production of Grazing Ewes Supplemented With Selenium. 31 AUST. J. EXP. AGR. 25–31 (1991)). Supplementation with selenium has been observed to help lamb survival rate.(Langerlands, J. P. et al; Subclinical Selenium Deficiency. 2-The Response in Reproductive Performance of Grazing Ewes Supplemented With Selenium. 31 AUST. J. EXP. AGR. 33–35 (1991)). Lamb weights increased significantly at all ages when their dams were supplemented with selenium.(Langlands, J. P. et al; Subclinical Selenium Deficiency. 3-The Selenium Status and Productivity of Lambs Born to Ewes Supplemented With Selenium. 31 AUST. J. EXP. AGR. 37–43 (1990); Langlands, P. J. et al; Selenium Supplements for Grazing Sheep. 28 ANIMAL FEED SCI. TECH. 1–13 (1990)). Administration of intraruminal pellets selenium to dairy heifers resulted in weight gains of 0.11–0.12 kg/day over control.(Wichtel, J. J. et al; The Effect of Intra-ruminal Se Pellets on Growth Rate, Lactation and Reproductive Efficacy in Dairy Cattle, 42 NEW ZEALAND VET. J. 205–210 (1994)).

Selenium has been recognized as an essential nutrient in the production of livestock because of its preventive action against certain diseases such as liver necrosis in pigs, white muscle disease in calves and lambs, and pancreatic degeneration and exudative diathesis involving the capillaries in poultry. The level of selenium in feeds such as cereal grains and soybeans is in most areas inadequate to meet the nutritional needs of livestock. U.S. Pat. No. 4,042,722 discloses selenium containing additives for use as supplements in livestock feeds having a selenium content of not more than 5,000 ppm. Further, FDA has approved the use of selenium as a livestock feed supplement at levels of 0.1–0.3 ppm. Commercial trace mineral premixtures which are sometimes added to animal feed may contain $MnO_2$, $ZnO$, $FeSO_4$, $FeCO_3$, $CuSO_4$. Additionally, they sometimes contain trace amounts of selenium but not tellurium.

The nontoxic tellurium compound AS101, ammonium trichloro(dioxyethylene-O,O')tellurate, first developed by the present inventors has been shown to have beneficial effects in diverse preclinical and clinical studies. Most of its activities have been attributed in part to stimulation of endogenous production of a variety of cytokines. The immunomodulating properties of AS101 play a crucial role in preclinical studies demonstrating a protective effect in parasite and viral infected mice models, in autoimmune diseases, and in a variety of tumor models. AS101 has also been shown to have protective properties against lethal and sublethal effects of irradiation and chemotherapy, including protection from hemopoietic damage and alopecia, resulting in increased survival. Phase I and II clinical trials with AS101 on cancer patients showed it was non-toxic and exerted immunomodulatory effects that are associated with its beneficial clinical effects.

A number of human commercial dietary supplement products contain trace amounts of tellurium. The present invention is based on the discovery that a source of tellurium when administered orally, could positively affect the livability, weight gain or feed conversion efficacy of poultry. No one has added tellurium compounds to animal feed.

SUMMARY OF THE INVENTION

The invention comprises the administration in a pharmaceutically acceptable carrier including animal feed, of an effective amount of a source of tellurium to improve the health and enhance the livability, cumulative weight gain and feed conversion efficacy of poultry and other animals. One or more objects of the present invention are accomplished by the provision of a method of supplementing standard feed with a source of tellurium. The tellurium may be administered as free tellurium, inorganic tellurium or organic tellurium and fed immediately after hatching or birth of the animal or the animals afflicted with or susceptible to poor growth performance. Organic tellurium is preferred.

Accordingly, it is a primary object of the invention to provide a method to enhance growth performance and feed conversion efficacy, prevent poor growth performance in animals susceptible to same, or treat poor growth performance in animals using a source of tellurium. The method comprises feeding the hatchlings a tellurium supplemented diet at a point in time preferably within the first five days of hatching, more preferably within the first three days of hatching.

It is an object of the present invention to provide a feed composition with which the undesired mortality of young chicks can be reduced.

It is also an object of this invention to provide a novel feed composition which is resistant to degradation, nontoxic, low cost, readily assimiable, which does not leave a toxic residue in the meat of animals, and which can be packaged in bulk, shipped and divided into dosage units form at the point of use. The process can be carried out efficiently and meets requirements important for commercial production.

These and other objects of the invention will become apparent from a review of the specification.

DETAILED DESCRIPTION OF THE INVENTION

Surprisingly, it has been discovered that the growth of poultry can be stimulated, the livability, cumulative weight gain and feed conversion efficacy of the poultry can be improved by feeding a formulation of the present invention.

An advantage of the present invention is to increase the livability of poultry, fed the feed composition of the invention. "Livability" is judged by determining the proportion of animals on a particular feed regimen which are alive after a particular period of time. When poultry, are grown for food production, there is generally a loss of a small but constant percentage of the animals prior to bringing the animals to market. This means that the feed eaten prior to death of the animals and the other costs expended on the animals that do not survive are wasted. The decrease in death rate of the animals during the growing period of the present invention and improved feed conversion efficacy, results in reduced costs of raising such animals.

The compositions can also be fed in a feed composition as a treatment for failure to thrive or already established low birth weight in the animal.

The term "organic tellurium" is defined to mean any tellurium element bonded to an organic moiety, including via atoms that differ from carbon, such as oxygen. Preferred organic tellurium compounds for use in the invention are described in 37 INORG. CHEM. 1707 (1998) incorporated herein by reference and include those of the formula:

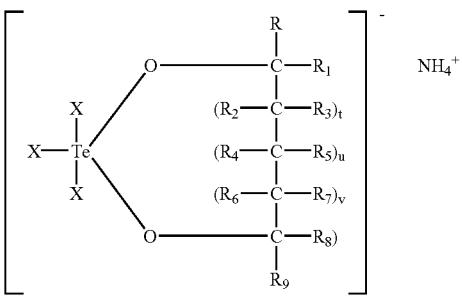

(A)

or

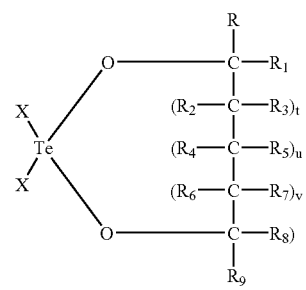

(B)

or

Te(ethylene glycol)$_2$

Te(citrate)$_2$

An organo or inorgano compound containing tellurium oxide or

TeO$_2$ or complexes of TeO$_2$     (C)

or

PhTeCl$_3$     (D)

or

TeX$_4$, when X is Cl, Br or F or the following complex: TeO$_2$·HOCH$_2$CH$_2$OH·NH$_4$Cl;

or (C$_6$H$_5$)$_4$P+(TeCl$_3$(O$_2$C$_2$H$_4$))—     (E)

wherein t is 1 or 0; u is 1 or 0; v is 1 or 0; R, R$_1$, R$_2$, R$_3$, R$_4$, R$_5$, R$_6$, R$_7$, R$_8$, and R$_9$ are the same or different and are independently selected from the group consisting of hydrogen, hydroxyalkyl of 1 to 5 carbons, hydroxy, alkyl or from 1 to 5 carbon atoms, halogen, haloalkyl of 1 to 5 carbon atoms, carboxy, alkylcarbonylalkyl of 2 to 10 carbons, alkanoyloxy of 1 to 5 carbon atoms, carboxyalkyl of 1 to 5 carbons atoms, acyl, amido, cyano, amidoalkyl of 1 to 5 carbons, N-monoalkylamidoalkyl of 2 to 10 carbons, N,N-dialkylamidoalkyl of 4 to 10 carbons, cyanoalkyl of 1 to 5 carbons alkoxy of 1 to 5 carbon atoms, alkoxyalkyl of 2 to 10 carbon atoms and —$COR_{10}$ wherein $R_{10}$ is alkyl of 1 to 5 carbons; and X is halogen; while the ammonium salt is illustrated, it is understood that other pharmaceutically acceptable salts such as K+ are within the scope of the invention. The compounds with the five membered rings are preferred.

As used herein and in the appended claims, the term alkyl of 1 to 5 carbon atoms includes straight and branched chain alkyl groups such as methyl; ethyl; n-propyl; n-butyl, and the like; the term hydroxyalkyl of 1 to 5 carbon atoms includes hydroxymethyl; hydroxyethyl; hydroxy-n-butyl; the term halkoakyl of 1 to 5 carbon atoms includes chloromethyl; 2-iodoethyl; 4-bromo-n-butyl; iodoethyl; 4-bromo-n-pentyl and the like; the term alkanoyloxy of 1 to 5 carbon atoms includes acetyl, propionyl, butanoyl and the like; the term carboxyalkyl includes carboxymethyl, carboxyethyl, ethylenecarboxy and the like; the term alkylcarbonylalkyl includes methanoylmethyl, ethanoylethyl and the like; the term amidoalkyl includes —$CH_2CONH_2$; —$CH_2CH_2CONH_2$; —$CH_2CH_2CH_2CONH_2$ and the like; the term cyanoalkyl includes —$CH_2CN$; —$CH_2CH_2CN$; —$CH_2CH_2CH_2CN$ and the like; the alkoxy, of 1 to 5 carbon atoms includes methoxy, ethoxy, n-propoxy, n-pentoxy and the like; the terms halo and halogen are used to signify chloro, bromo, iodo and fluoro; the term acyl includes $R_{16}CO$ wherein $R_{16}$ is H or alkyl of 1 to 5 carbons such as methanoyl, ethanoyl and the like; the term aryl includes phenyl, alkylphenyl and naphthyl; the term N-monoalkylamidoalkyl includes —$CH_2CH_2CONHCH_3$, —$CH_2CONHCH_2CH_3$; the term N,N-dialkylamidoalkyl includes —$CH_2CON(CH_3)_2$; $CH_2CH_2CON(CH_2—CH_3)_2$. The tellurium based compounds that are preferred include those of the formula:

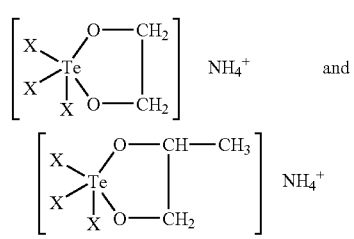

wherein X is halogen. The preferred halogen species is chloro.

Other compounds which are based on tellurium and may be used in the practice of the invention include $PhTeCl_3$, $TeO_2$, $TeO_2 \cdot HOCH_2CH_2OH \cdot NH_4Cl$ and $TeX_4$ $(C_6H_5)_4$ P+ $(TeCl_3(O_2C_2H_4))$— (Z. Naturforsh, 36, 307–312 (1981)). Compounds of the following structure are also included:

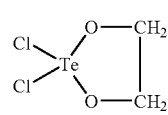

Other compounds useful for the practice of invention include:

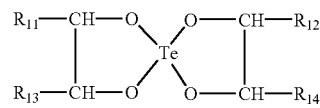

wherein $R_{11}$, $R_{12}$, $R_{13}$ and $R_{14}$ are independently selected from the group consisting of hydrogen, hydroxy-alkyl of 1–5 carbons atoms, hydroxy and alkyl of 1–5 carbons atoms.

Useful dihydroxy compounds for use in the preparation of compounds of structure A or B, include those of formula I wherein R, $R_1$, $R_4$ and $R_5$ are as shown in the Table:

TABLE (I)

$$HO-\underset{R_1}{\underset{|}{\overset{R}{\overset{|}{C}}}}-\underset{R_5}{\underset{|}{\overset{R_4}{\overset{|}{C}}}}-OH$$

| R | $R_1$ | $R_4$ | $R_5$ |
|---|---|---|---|
| H | H | H | H |
| H | Cl | H | H |
| H | $OCH_3$ | H | H |
| H | $COOCH_3$ | H | H |
| H | H | CN | H |
| H | CHO | H | H |
| H | H | COOH | H |
| H | $CH_2COOH$ | H | H |
| H | H | $CH_2COOCH_3$ | H |
| H | I | H | H |
| H | H | Br | H |
| H | H | $CONH_2$ | H |
| H | H | $CH_2OH$ | H |
| H | COOH | H | H |

Other dihydroxy compounds for use in the preparation of compounds A and B include those of formula II wherein R, $R_1$, $R_2$, $R_3$, $R_4$ and $R_5$ are as shown in the Table:

(II)

$$HO-\underset{R_1}{\underset{|}{\overset{R}{\overset{|}{C}}}}-\underset{R_3}{\underset{|}{\overset{R_2}{\overset{|}{C}}}}-\underset{R_5}{\underset{|}{\overset{R_4}{\overset{|}{C}}}}-OH$$

| R | $R_1$ | $R_2$ | $R_3$ | $R_4$ | $R_5$ |
|---|---|---|---|---|---|
| H | H | H | H | H | H |
| H | H | Cl | H | H | H |
| H | $CH_2OH$ | H | H | H | H |
| H | H | OH | H | H | H |
| H | H | H | $CH_3$ | H | H |
| H | H | H | $CH_2Cl$ | H | H |
| H | H | H | COOH | H | H |
| H | H | H | $CH_2COOH$ | H | H |
| H | H | H | CHO | H | H |
| H | H | H | H | H | $CH_2CHO$ |
| H | H | $CONH_2$ | H | $H_2$ | $CH_3$ |
| H | H | H | CN | H | H |
| H | H | H | H | $CH_2CONH_2$ | H |
| H | H | H | $COOCH_3$ | H | H |
| H | $H_3$ | $OCH_3$ | H | H | H |

Other dihydroxy compounds for use in making compound of formula A and B include those of formula III wherein R, $R_1$, $R_2$, $R_3$, $R_4$ and $R_5$ are as shown in the Table.

$$HO-\underset{\underset{R_1}{|}}{\overset{\overset{R}{|}}{C}}-\underset{\underset{R_3}{|}}{\overset{\overset{R_2}{|}}{C}}-\underset{\underset{R_5}{|}}{\overset{\overset{R_4}{|}}{C}}-\underset{\underset{R_9}{|}}{\overset{\overset{R_8}{|}}{C}}-OH \quad (III)$$

| R | $R_1$ | $R_2$ | $R_3$ | $R_4$ | $R_5$ | $R_8$ | $R_9$ |
|---|---|---|---|---|---|---|---|
| H | H | H | H | H | H | H | H |
| H | H | Cl | H | H | H | H | H |
| H | H | H | H | Br | H | H | H |
| H | H | $OCH_3$ | H | H | H | H | H |
| H | $H_2$ | $CONH_2$ | H | H | H | H | H |
| H | Br | H | H | Br | H | H | H |
| H | H | H | H | $CH_2COOH$ | H | H | H |
| H | H | Cl | Cl | H | H | H | H |
| H | $CH_2COOH$ | H | H | H | H | H | H |
| H | H | $CH_3$ | H | H | H | H | H |
| H | $CH_3$ | H | H | H | H | H | H |
| H | $CH_2Cl$ | H | H | H | H | H | H |
| H | H | H | I | H | H | H | H |
| H | $CH_2CN$ | H | H | H | H | H | H |
| H | H | H | H | $CH_2CH_2OH$ | H | H | H |

Additional dihydroxy compounds include those of formula IV wherein R, $R_1$, $R_2$, $R_3$, $R_4$ and $R_5$ are as shown in the Table.

$$HO-\underset{\underset{R_1}{|}}{\overset{\overset{R}{|}}{C}}-\underset{\underset{R_3}{|}}{\overset{\overset{R_2}{|}}{C}}-\underset{\underset{R_5}{|}}{\overset{\overset{R_4}{|}}{C}}-\underset{\underset{R_7}{|}}{\overset{\overset{R_6}{|}}{C}}-\underset{\underset{R_9}{|}}{\overset{\overset{R_8}{|}}{R}}-OH \quad (IV)$$

| R | $R_1$ | $R_2$ | $R_3$ | $R_4$ | $R_5$ | $R_6$ | $R_7$ | $R_8$ | $R_9$ |
|---|---|---|---|---|---|---|---|---|---|
| H | H | H | H | H | H | H | H | H | H |
| H | H | Cl | H | H | H | Cl | H | H | H |
| H | H | Cl | Cl | H | H | H | H | H | H |
| H | H | $CONCH_3$ | H | H | H | Br | H | H | H |
| H | H | Br | H | H | H | $CON(CH_3)_2$ | H | H | H |
| H | H | H | $OCH_3$ | H | H | H | H | H | H |
| H | H | H | H | $OCH_3$ | H | H | H | H | H |
| H | H | H | H | $CH_2COOH$ | H | H | H | H | H |
| H | H | COOH | H | H | H | H | H | H | H |
| H | $CH_3$ | H | H | H | H | H | H | H | H |
| $CH_3$ | H | H | H | H | $CH_3$ | H | H | H | H |
| H | $CH_2CH_3$ | H | H | H | H | H | Cl | H | H |
| H | $CH_2CN$ | H | H | $CH_2OH$ | H | H | H | H | H |
| H | H | H | I | H | H | H | H | CN | H |
| H | $CH_2CH_2COOH$ | H | H | H | H | H | H | H | H |
| H | H | CHO | H | H | H | H | H | H | H |
| H | H | H | F | H | H | H | H | H | H |

Compounds of the following formula are also included:

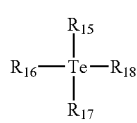

herein $R_{15}$, $R_{16}$, $R_{17}$ and $R_{18}$ are independently selected from halogen, alkyl of 1–5 carbons; aryl, acyl of 1–5 carbon hydroxyalkyl of 1–5 carbons and aminoalkyl of 1–5 carbons may be made by reacting the appropriate di, tri or tetrahalotelluride with the appropriate hydroxy compound which may be of the formula: HO—$R_{19}$;

wherein $R_{19}$; is alkyl of 1 to 5 carbons, haloalkyl of 1 to 5 carbons, aryl, alkylaryl, alkylamido of 1 to 5 carbons, alkylcarbonyl of 1 to 5 carbons, cyanoalkyl of 1 to 5 carbons, cyanoalkyl of 1 to 5 carbons, and an alkoxyalkyl of 2 to 10 carbons. Specific examples of $R_{16}$ include methyl, ethyl, n-propyl, phenyl, tolyl, amidoethyl, cyanomethyl, methyloxymethyl and $CH_2CH_2COOH$.

These compounds are described in U.S. Pat. No. 4,761,490 which is incorporated by reference. In addition, inorganic tellurium compounds such as $TeCl_4$; $TeBr_4$ and compounds which give in aqueous solution $TeO_2$ preferably in the form of a complex such as for example $TeO_2$ complex with citric acid or ethylene glycol may be used.

The preferred compound is ammonium trichloro (dioxoethylene-O,O') tellurate. The tellurium compound may be administered orally, via yolk sac injection, parenterally, in ovo, or via inhalation by spray. The parenteral route of administration may be intravenously, subcutaneously, intramuscularly etc. The composition of the present invention will mostly be supplied in the solid state, for example as a powder, in pellets or crumbs.

In one embodiment of the invention, the source of tellurium may be administered orally or added to the standard feed and direct fed or administered via a compatible liquid vehicle. It may be supplied as such or mixed with conventional nutrients such as, for example corn or soya. It will be understood by those skilled in the art that the active tellurium derivatives described herein can also be fed in combination with together commercially formulated or similar feeds for chickens and other animals. Tellurium is preferably combined with the feed by mixing to evenly distribute. Adding a fixed amount of tellurium directly to the feed has the advantage of convenience and is more economical, than weighing animals and adjusting dosages each day.

Alternatively, oral administration may be as a solid dosage form i.e. a daily dietary supplement tablet with conventional excipients such as lactose, microcrystalline cellulose and the like. It has been found that the tellurium compounds useful in the practice of the invention will hydrolyze in the presence of water. These hydrolyzed compositions are active in vivo and in vitro although the hydrolyzed compositions eventually decompose and lose their ability to induce lymphokine secretion. For this reason, the compositions should be freshly prepared. Preferably, the compounds should be kept under anhydrous conditions until just prior to being used.

Pharmaceutically acceptable carriers or diluents may be, for example, binders, (e.g., syrup, gum Arabic, gelatin, sorbitol, tragacanth, polyvinylpyrrolidone, etc), excipients (e.g., lactose, sucrose, corn starch, sorbitol), lubricants (e.g., magnesium stearate, talc, polyethylene glycol, silica, etc.), disintegrants (e.g. microcrystalline cellulose, potato starch, etc.), wetting agents (e.g. sodium lauryl sulfate, etc.), and the like. These pharmaceutical preparations may be in the form of a solid preparation such as tablets, capsules, powders, etc., or in the form of a liquid preparation such as solution, suspension, emulsion, etc., when administered orally. When administered parenterally, the pharmaceutical preparations may be in the form of a suppository, an injection or an intravenous drip, a physiological salt solution, and so on.

The tellurium may also be administered with vitamin, microbial (e.g. Lactobacillus), antimicrobial, enzyme, and forage additives. Examples of antibiotics approved for use in animal feed include bacitracin, bacitracin methylenedisalicylate, lincomycin, or virginiamycin. Vitamin additives may be selected from vitamins A, B1, B6, B12, biotin, choline, folic acid, niacin, panthothenic acid, riboflavin, C, D, E, and K. Mineral additives may be added from calcium, phosphorous, selenium, chlorine, magnesium, potassium, sodium, copper, iodine, iron, manganese, chromium, and zinc. The concentration of the vitamins and minerals will generally be between about 0.01% and about 5% by weight of the dry matter.

In another embodiment of the present invention, the source of tellurium may be combined with immunoactive agents, such as vaccines; other therapeutic drugs, such as growth promotants or hormones; digestion enhancers, such as bile salts; palatability modifiers, such as spices or gums; or feed intake regulators, such as food coloring.

A variety of other substances can be employed as adjuvants in the present invention. Some examples include: polysaccharides, peptides, macromolecules.

The ratio of selenium to tellurium in the feed composition can be in the range between about 1:1 and about 1:50.

In addition to chickens, the nutritional composition is equally effective in enhancing growth in other fowl including turkeys, pheasants, and ducks.

EXAMPLE 1

The dose of ammonium trichloro (dioxoethylene-O,O') tellurate or a pharmaceutically acceptable salt thereof varies depending on the administration route, ages, weights and animal type, but may be in the range of from 0.1 gram to 20 grams per metric ton, preferably from 1 to 15 grams/metric ton, and most preferably 12.5 grams per metric ton, administered daily in one or more divided doses.

The efficacy of the invention has been demonstrated in three day old inanited chicks where three concentrations of AS101 were introduced into the feed (500–12,500 mg/metric ton) for three weeks. Each chick included in the study weighed exactly 80 g. via accurate electronic scale and each chick was marked. There were five different treatment groups, each group comprising ten chicks in four repetitions. The five groups of animals were tested as follows: Group 1 received a standard feeding diet without selenium; Group 2 received the standard feeding diet supplemented with 500 mg/metric ton of selenium; Group 3 received the same diet as Group 2 with the addition of AS101 at a concentration of 500 mg/metric ton; Group 4 received the same diet as Group 2 with the addition of AS101 at a concentration of 2,500 mg/metric ton; Group 5 received the same diet as Group 2 with the addition of AS101 at a concentration of 12,500 mg/ton. All the experiments were randomized and open. The results of each group represent the mean of 40 chicks.

For growth period days 3–24, the performance of groups of three day old birds, fed AS101 concentrations of 500 mg/metric ton, 2,500 mg/metric ton or 12,500 mg/metric ton were compared to groups of control birds fed either a standard feeding diet without selenium or a standard feeding diet with an addition of 300 mg/metric ton selenium. Body weight (BW) was measured after 24 days. At the end of 24 days, the animals were examined for gross signs of toxicity. A gross visual examination was carried out. The liver of each chick was extracted and weighed. No pathological changes were observed in histological studies. The survival rate was 100%. Since there were no mortalities in any group, it is clear that AS101 had an effect on livability.

Results are presented in Table 1. The group with the lowest mean body weight was Group 1, where the diet was the standard feeding diet without selenium. Group 2, which was fed the diet of Group 1, with an addition of 300 mg/ton of selenium showed a 0.4% increase in BW over Group 1. The increase in BW is caused by the addition of the selenium to the mixture.

Addition of AS101 to the same diet as Group 2 resulted in the highest feed efficacy. The addition of AS101 to the mixture, that includes selenium, showed a BW increase of 1.7% at a concentration of 500 mg/ton, 2.3% at a concentration of 2,500 mg/ton, and 5% at a concentration of 12,500 mg/ton. Group 5, which was fed the highest level of tellurium, showed a 5.4% increase in BW over Group 1.

It appears that food intake is not altered by feeding with AS101. At day 21 the difference is only 12 g or about 1%. The differences in BW between AS101 supplemented and unsupplemented groups was highly significant, even though feed intake was almost identical in all groups.

A significant increase in BW was found at 12.5 g/ton AS101.

TABLE 1

PERFORMANCE DATA OF CHICKS AT THE GROWTH PERIOD 3–21 DAYS DIET WITH AS101

| TREATMENT # | BW-24D g. | BW, % OF CONTROL | FEED INTAKE g. | FEED EFFICACY g./g. | FE, % OF CONTROL | LIVER, % OF BW |
|---|---|---|---|---|---|---|
| 1 | 1013 | 94.6 | 1376 | 0.679 | 96.2 | 2.36 |
| 2 | 1072 | 100 | 1405 | 0.706 | 100 | 2.32 |
| 3 | 1090 | 101.7 | 1382 | 0.731 | 103.5 | 2.36 |
| 4 | 1097 | 102.3 | 1375 | 0.74 | 104.8 | 2.48 |
| 5 | 1126 | 105 | 1417 | 0.738 | 104.5 | 2.39 |

From these results it can be concluded that by feeding three day old chicks standard diet containing at least 0.5 gm of selenium per metric ton supplemented with 12.5 gm of tellurium compound per metric ton, the growth rate of the young chicks can be increased up to 5% by day 21.

The foregoing description of the invention has been presented for purposes of illustration and description. It is not intended to be exhaustive or to limit the invention to the precise form disclosed. Obvious modifications or variations are possible in light of the above teachings. All such obvious modifications and variations are intended to be within the scope of the appended claims.

The invention claimed is:

1. A method for enhancing poultry growth, which comprises administering to said poultry an effective amount of trichloro (dioxoethylene-O,O') tellurate.

2. A method for feeding for enhancing poultry growth, which comprises administering to said poultry a feed containing from 0.1 to 20 grams per metric ton of feed of trichloro (dioxoethylene-O,O') tellurate.

3. A method for feeding for enhancing the growth of poultry chicks, which comprises administering to said poultry chicks a feed containing from 0.1 to 20 grams per metric ton of feed of trichloro (dioxoethylene-O,O') tellurate.

* * * * *